United States Patent [19]

Protheroe et al.

[11] Patent Number: 5,120,906
[45] Date of Patent: Jun. 9, 1992

[54] HANDWRITING CAPTURE DEVICE

[75] Inventors: Robert L. Protheroe; David C. Wills; Scott M. Klement, all of Cambridge, Ohio

[73] Assignee: NCR Corporation, Dayton, Ohio

[21] Appl. No.: 703,430

[22] Filed: May 17, 1991

[51] Int. Cl.⁵ .............................................. G08C 21/00
[52] U.S. Cl. ........................................ 178/18; 382/3
[58] Field of Search .................. 178/18, 19, 20; 382/3

[56] References Cited

U.S. PATENT DOCUMENTS

| | | | |
|---|---|---|---|
| 3,204,356 | 9/1965 | Close et al. | 40/10 |
| 3,514,874 | 6/1970 | Strohl | 35/37 |
| 4,493,104 | 1/1985 | Lukis | 178/18 X |
| 4,600,807 | 7/1986 | Kable | 178/19 |
| 4,649,232 | 3/1987 | Nakamura et al. | 178/18 |
| 4,679,241 | 7/1987 | Lukis | 382/3 X |

OTHER PUBLICATIONS

Allgeier et al., U.S. Ser. No. 07/575,096, Filed Aug. 30, 1990, U.S.

*Primary Examiner*—Stafford D. Schreyer
*Attorney, Agent, or Firm*—Paul W. Martin

[57] ABSTRACT

A handwriting capture device which employs a highly sensitive digitizer to accurately capture signature information entered using a writing force greater than or equal to a predetermined writing force. The handwriting capture device includes a housing having a top surface, a resistive membrane digitizer mounted in the top surface and having a low pattern density, a layer of urethane rubber for frictionally holding the receipt in place, circuitry for processing digitizer information, a clamp for retaining a receipt in place over the digitizer during movement of the device, and circuitry for sensing the presence of the receipt and for activating data capture by the digitizer when the receipt is positioned under the clamp. In the preferred embodiment, the clamp also serves to minimize finger contact with the digitizer.

38 Claims, 3 Drawing Sheets

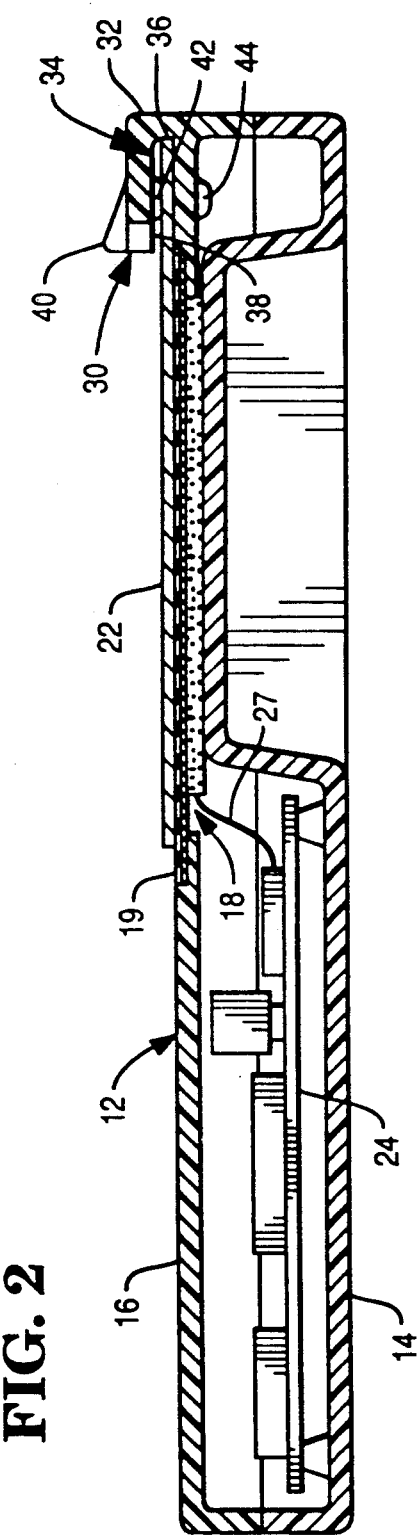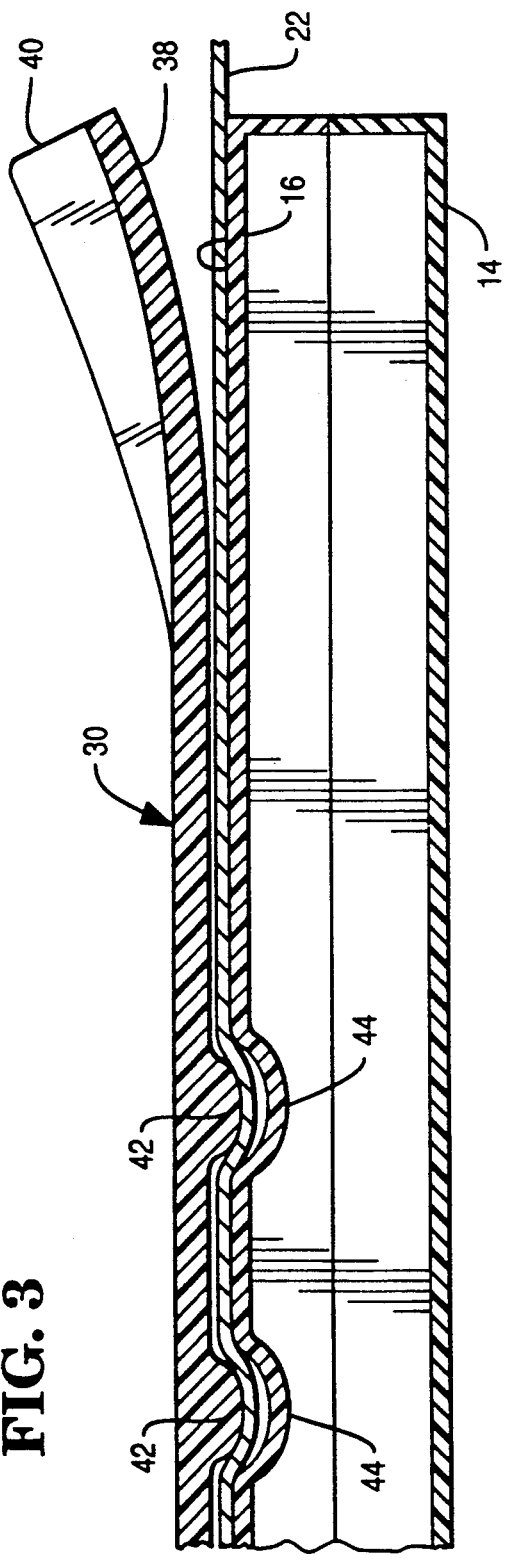

HANDWRITING CAPTURE DEVICE

CROSS REFERENCE TO RELATED APPLICATION

The present invention is related to commonly assigned and co-pending U.S. application entitled, "Write Input Transaction Apparatus and Method", filed Aug. 30, 1990, invented by Allgeier et al., and having a Ser. No. 07/575,096.

BACKGROUND OF THE INVENTION

The present invention relates to signature capture devices and more specifically to a handwriting capture device.

Today, retailers are burdened with having to store and retrieve large amounts of paper records from credit and check transactions. Normally, these records are produced at a retail terminal as master copies of sales receipts, and which are removed from the terminal at the end of the business day for balancing and entry into accounting journals and shipment to processing and storage facilities. Allgeier et al. discloses a write input device employing a display underneath a transparent digitizer to capture signature information. The display gives a customer feedback for stylus input.

While the Allgeier et al. device works well, having a liquid crystal display makes it expensive. Therefore, it would be desirable to eliminate the display and reduce the cost by using a low-cost resistive membrane digitizer. The low-cost resistive membrane must function in response to minimal signing force applied by an ordinary writing instrument such as a pen.

The use of pressure-sensitive resistive membrane digitizers is subject to false actuations, including those caused by finger contact. If the digitizer is shorted by finger contact during signing, the digitized points representing the signature will be obscured by the finger points, resulting in random scribbling in place of the signature.

The sensitivity of a pressure-sensitive digitizer is determined by the density of the spacer dot pattern, which maintains separation between the top and bottom sheets of the digitizer. The more dense the pattern is, the more resistant the digitizer is to finger actuation. However, a high pattern density requires more writing force to capture a signature. In systems without displays or other sources of immediate feedback, it is essential that the digitizer be sensitive to writing force.

Therefore, it would be desirable to provide a handwriting capture device without a display, but having a digitizer sensitive to minimal writing force.

SUMMARY OF THE INVENTION

In accordance with the teachings of the present invention, a handwriting capture device is provided. The handwriting capture device includes a housing having a top surface, a pressure-sensitive digitizer having a low pattern density and mounted in the top surface, circuitry for sensing the presence of a receipt and activating the digitizer, circuitry for processing signature information from the digitizer, and a clamp for retaining the receipt in place over the digitizer. In the preferred embodiment, the clamp also serves to minimize finger contact with the digitizer.

It is accordingly an object of the present invention to provide a handwriting capture device.

It is another object of the present invention to provide a handwriting capture device, which is less expensive than a handwriting capture device employing a liquid crystal display mounted beneath a transparent digitizer.

It is another object of the present invention to provide a handwriting capture device which employs a highly sensitive low-cost digitizer which can capture signatures entered using minimal force from an ordinary writing instrument, such as a ballpoint pen.

It is another object of the present invention to provide a handwriting capture device which employs a clamp for holding a pre-printed receipt in place over the digitizer for signature.

It is another object of the present invention to provide a handwriting capture device which employs a clamp for holding a pre-printed receipt in place over the digitizer for signature and which minimizes finger contact with the digitizer.

It is another object of the present invention to provide a handwriting capture device which is lightweight, hand-held, and portable.

BRIEF DESCRIPTION OF THE DRAWINGS

Additional benefits and advantages of the present invention will become apparent to those skilled in the art to which this invention relates from the subsequent, description of the preferred embodiments and the appended claims, taken in conjunction with the accompanying drawings, in which:

FIG. 2 is a sectional view of the handwriting capture device taken along line 2—2 of FIG. 1.

FIG. 3 is a sectional view of the handwriting capture device of the present invention taken along lines 3—3 of FIG. 1;

DETAILED DESCRIPTION OF THE PREFERRED EMBODIMENT

Figure 1:
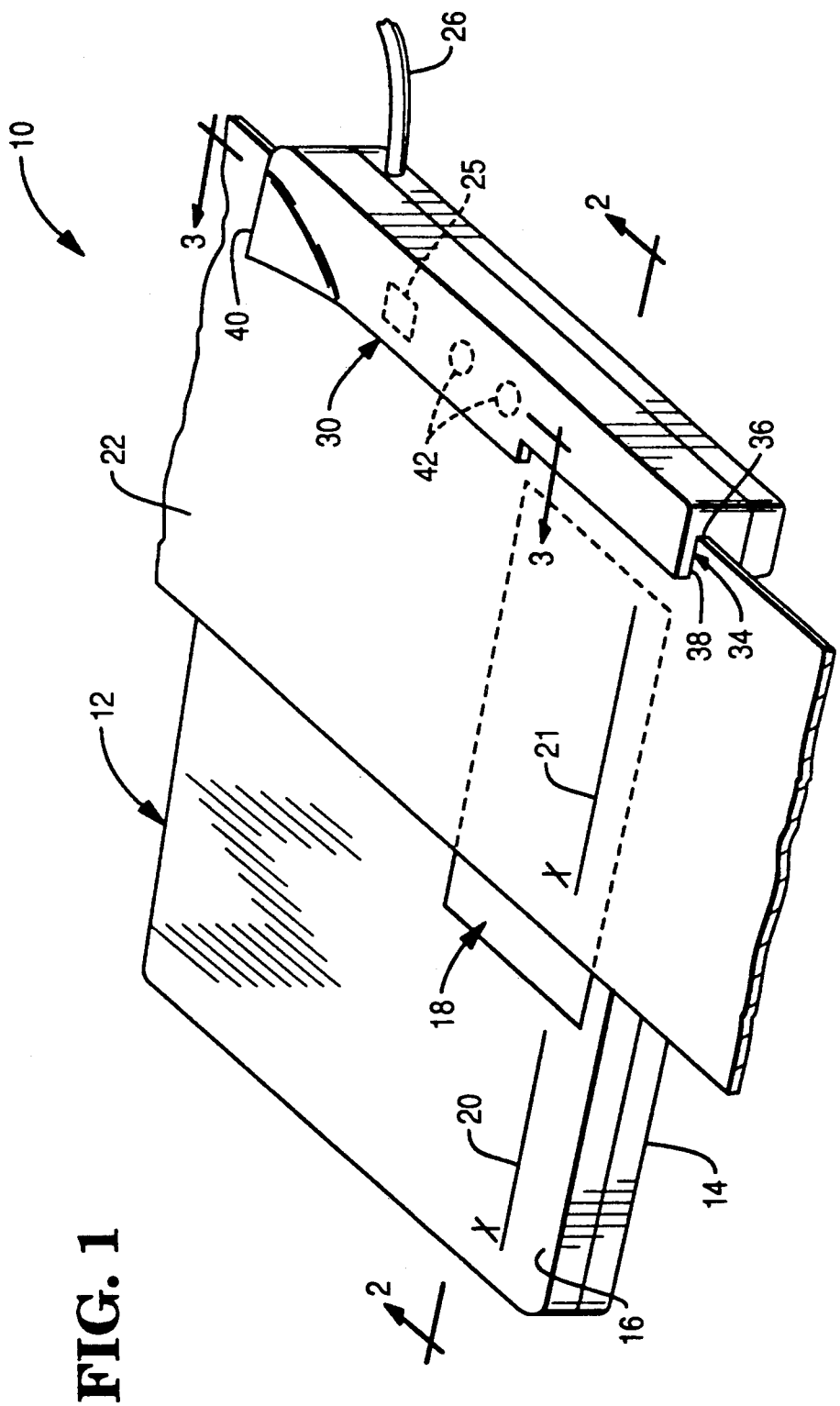
FIG. 1 is a perspective view of a first embodiment of the handwriting capture device of the present invention.

Turning now to FIGS. 1 and 2, a first embodiment of the handwriting capture device 10 of the present invention is shown. The handwriting capture device 10 includes a housing 12 having a bottom supporting surface 14 and a top surface 16. In this embodiment, the housing 12 is generally rectangular in shape. The handwriting capture device 10 is lightweight and portable. The left end of the housing 12 is sufficient in width and depth to facilitate grasping of the housing 12.

Within the top surface 16 is a pressure-sensitive digitizer 18, although other types of digitizers are also envisioned. The digitizer 18 is sensitive to signing forces greater than or equal to a predetermined minimum signing force, which is no more than about 10 to 15 grams. When a pen is used, the digitizer has a sensitivity sufficient to capture a handwriting that produces a legible ink impression on the receipt. In this embodiment, a digitizer manufactured by W. H. Brady & Co. and having a part number 2500044089 is used. This digitizer has a near separation between dots of 0.2 inches. Dot separations higher than 0.2 are not recommended because spurious digitizer readings are more likely to occur. Digitizers having dot separations as low as 0.16 inches may be used in the present invention to achieve valid handwriting capture.

A thin layer of urethane rubber 19 is affixed to the top surface of the digitizer 18. The urethane rubber 19 provides a high friction surface for keeping the receipt 22 in place. A signature line 20 on the upper surface 16 and to the left of the digitizer acts as a guide for lining up a receipt 22 having a signature line 21.

Also within the housing 12 is the electronic processing circuitry 24 for operating the digitizer 18 and for controlling information flow from the digitizer 18 to a point-of-service (POS) terminal (not shown). The digitizer 18 is coupled to the electronic circuitry 24 by a wire connector 27 and the electronic circuitry 24 is coupled to the POS terminal by a wire cable 26. The housing may also include circuitry 25 for sensing the presence of the receipt 22 and activating the digitizer 18. In this embodiment, circuitry 25 includes a commercially available optical switch having an emitting side and a receiving side, both on opposite sides of the receipt. The sensing circuit 25 activates data capture by the digitizer 18 when the receipt 22 is in position under a clamp 30 so as to minimize acceptance of false actuations.

The paper receipt 22 from the POS terminal is properly aligned and held in place during movement of the device 10 by the clamp 30 which is integrally located on the top surface 16 at the right end of the housing 12. The clamp 30 includes an inverted, generally L-shaped member 32 having an inner surface 34. A vertical portion 36 of the inner surface 34 provides a stop against which the receipt 22 is aligned. A horizontal portion 38 of the inner surface 34 holds the receipt 22 in contact with the top surface 16 of the housing 12. The distance from the horizontal surface 38 to the top surface 16 is sufficient to allow a receipt 22 to pass between the two surfaces. The clamp 30 also includes an upwardly flared portion 40 at one end to facilitate insertion of the receipt 22 into the clamp 30.

Referring now to FIG. 3, the horizontal portion 38 of the inner surface 34 includes downwardly facing protrusions 42 which are generally hemispherical in shape in order to fixedly retain the receipt 22 in place. Correspondingly shaped receptacles or dimples 44 are located in the top surface 16 below the protrusions 42. In combination, the dimples 44 and protrusions 42 act to increase the frictional force between the top surface 16 and the receipt 22, thereby effectively retarding movement of the receipt 22 out of the clamp 30.

In operation, a POS operator inserts the right edge of the receipt into the clamp 30, starting at the upwardly flared portion 40. The receipt 22 is further inserted until the signature line 21 is properly aligned with the signature line 20 on the top surface 16 of the housing 12. In this position, the receipt 22 will also be properly aligned with the vertical surface 36 of the clamp 30 and properly engaged between the dimples 44 and the protrusions 42. The sensing circuitry 25 activates data capture by the digitizer 18. A customer then signs his name with a writing device, such as a pen, on the signature line 21. Advantageously, the handwriting capture device 10 is lightweight and can be easily transferred from person to person without dropping the receipt 22.

Figure 4:
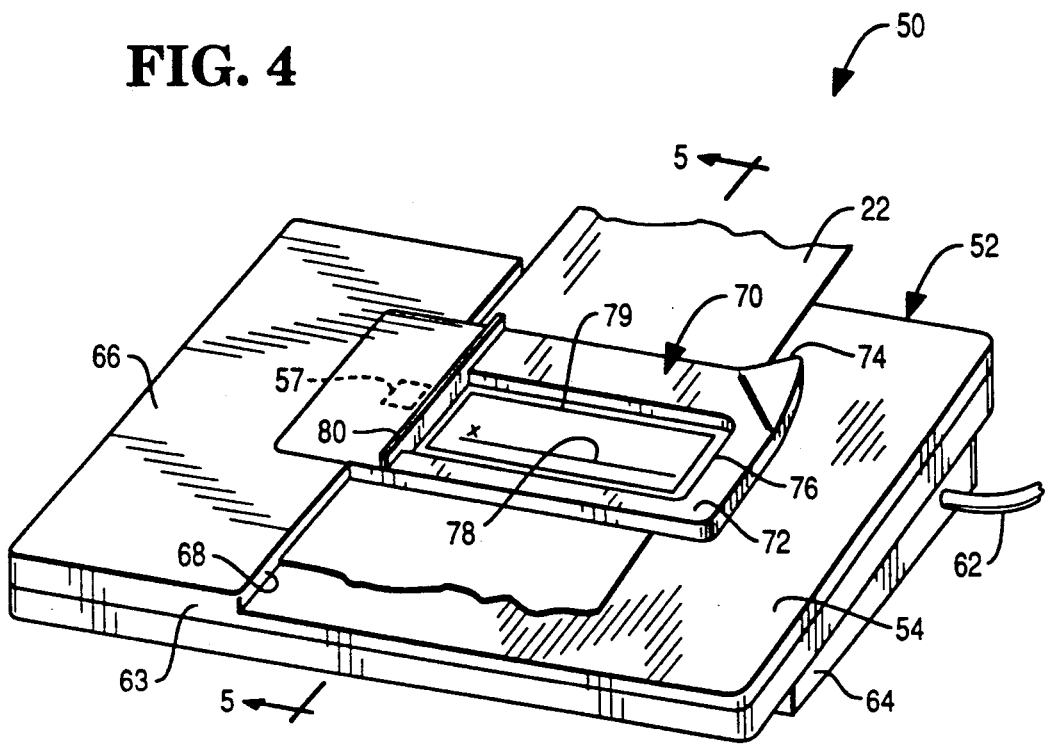
FIG. 4 is a perspective view of a second embodiment of the handwriting capture device of the present invention.
Figure 5:
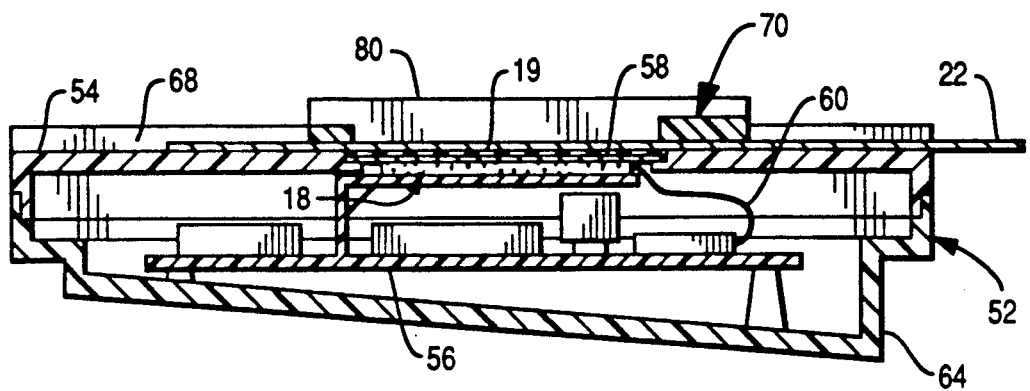
FIG. 5 is a sectional view of the handwriting capture device of the present invention taken along line 5—5 of FIG. 4.

Referring now to FIGS. 4 and 5, a second and preferred embodiment 50 of the handwriting capture device of the present invention is shown. Like the first embodiment, the preferred embodiment 50 includes a housing 52 having a top surface 54, electronic processing circuitry 56 within the housing 52, sensing circuitry 57 within the clamp 30, and a digitizer 18 within the top surface 54. The same considerations as in the first embodiment regarding digitizer choices apply in this embodiment. A thin layer of urethane rubber 19 is affixed to the top surface of the digitizer 18 to provide a high friction surface for keeping the receipt 22 in place. The electronic processing circuitry 56 is coupled to the digitizer 18 through a wire connector 60 and to a POS terminal (not shown) through a wire cable 62.

In addition, the housing 52 includes a top member 63 and a base member 64 which is inclined to facilitate writing. In order to properly align a receipt 22 for signature, the housing 52 includes a guide member 66 on the top surface 54 at one end of the housing 52. The guide member 66 has a vertical guide surface 68 against which the receipt 22 is aligned. The housing 52 is sufficient in width and depth to facilitate grasping of the housing 52.

The preferred embodiment also includes a clamp 70 for retaining the receipt 22 in place during movement of the device 50. The clamp 70 includes a frame member 72 which is generally rectangular in shape and which is made of transparent plastic to allow a customer to view the itemized information on the receipt 22 while signing. The clamp 70 is anchored at its left end and its right end is biased against the top surface 54 of the housing 52. Centrally located within the clamp 70 is a rectangular window 76 exposing the digitizer 18 below. The window 76 facilitates proper installation of the receipt 22 over the digitizer 18 and serves to quickly orient a customer with the correct location 78 for signing. The clamp 70 may also include an upwardly flared portion 74 for facilitating insertion of the receipt 22 under the clamp.

Advantageously, the clamp 70 also serves to minimize finger contact with the digitizer 18. The clamp 70 includes a vertical rib 80 extending across the clamp 70 for guarding the digitizer 18 from the thumb of the left hand of a customer writing with his right hand and also restricts access to the digitizer 18 by a customer writing with his left hand. The frame member 72 blocks contact with the digitizer 18 by the right hand. In addition, the window 76 provides insufficient room for finger placement, forcing finger placement on the pen to be a predetermined distance upwards from the pen tip for both right and left-handed customers.

In operation, a POS operator holds the device 50 in one hand and inserts the receipt using the other hand by slipping the receipt 22 under the upwardly flared portion 74 until the receipt 22 rests against the vertical guide surface 68 and the signature line 78 or box 79 is within the window 76. A customer then signs his name with a writing device, such as a pen, on the signature line 78. Advantageously, the clamp design facilitates one-handed insertion of the receipt 22. Also, the handwriting capture device 50 is lightweight and can be easily transferred from person to person without dropping the receipt 22.

Although the invention has been described with particular reference to certain preferred embodiments thereof, variations and modifications of the present invention can be effected within the spirit and scope of the following claims.

What is claimed is:

1. A handwriting capture device comprising:
   a housing having a top surface;

a digitizer, mounted within the top surface;

retaining means located externally on the top surface for holding an externally provided record member in a predetermined position on the top surface; and means coupled to the digitizer for processing written information.

2. The handwriting capture device as recited in claim 1, wherein the digitizer is a pressure-sensitive digitizer.

3. The handwriting capture device as recited in claim 2, wherein the digitizer is sensitive to a signing force greater than or equal to a predetermined minimum signing force from a writing instrument applied to the record member over the digitizer.

4. The handwriting capture device as recited in claim 1, further comprising means coupled to the digitizer for sensing the presence of the record member and for activating data capture by the digitizer when the record member is positioned under the retaining means.

5. The handwriting capture device as recited in claim 1, wherein the retaining means comprises a clamp over the record member for holding the record member in place during movement of the device.

6. The handwriting capture device as recited in claim 1, further comprising a guard over the record member for minimizing finger contact with the digitizer.

7. The handwriting capture device as recited in claim 1, further comprising a guide on the top surface for aligning an edge of the record member along the guide.

8. The handwriting capture device as recited in claim 1, wherein the retaining means further comprises a layer of urethane rubber over the digitizer.

9. The handwriting capture device as recited in claim 1, wherein the housing comprises:

a top member containing the top surface, the top surface being inclined towards an operator to facilitate handwriting; and a base member underneath the top member.

10. The handwriting capture device as recited in claim 5, wherein the clamp comprises:

an inverted L-shaped member mounted on the top surface of the housing having an inner horizontal surface and an inner vertical surface;

a protrusion extending downwardly from the inner horizontal surface; and a receptacle corresponding to the shape of the protrusion within the top surface of the housing.

11. The handwriting capture device as recited in claim 10, wherein the protrusion and receptacle are hemispherical in shape.

12. The handwriting capture device as recited in claim 5, wherein the clamp has a window over the digitizer.

13. The handwriting capture device as recited in claim 5, wherein the clamp comprises:

a frame member; and a window within the frame member and over the digitizer.

14. The handwriting capture device as recited in claim 13, wherein the clamp further comprises an upwardly flared portion at one end of the clamp for facilitating insertion of a record member into the clamp.

15. The handwriting capture device as recited in claim 13, wherein the clamp is transparent.

16. The handwriting capture device as recited in claim 6, wherein the guard comprises:

a frame member around the digitizer; and a vertical rib member mounted across the frame member.

17. The handwriting capture device as recited in claim 5, wherein the clamp is operative to hold the record member in place on the top surface of the housing during transfer of the device between a point-of-service operator and a customer.

18. The handwriting capture device as recited in claim 5, wherein the clamp is also operative to minimize finger contact with the digitizer.

19. The handwriting capture device of claim 2, wherein the digitizer has upper and lower sheets electrically coupled at a plurality of dots by pressure from handwriting, the digitizer having a near separation between dots of about 0.16 to 0.2 inches.

20. The handwriting capture device as recited in claim 3, wherein the minimum signing force is no more than about 10 to 15 grams.

21. The handwriting capture device as recited in claim 2, wherein the digitizer has a sensitivity sufficient to capture handwriting that produces a legible ink impression on the record member.

22. A handwriting capture device comprising:

housing having a top surface;

a pressure sensitive digitizer, mounted within the top surface, have upper and lower sheets electrically coupled at a plurality of dots by pressure from handwriting, the digitizer having a near separation distance between dots of about 0.16 to 0.2 inches, and being sensitive to a predetermined minimum writing force of no more than about 10 to 15 grams from an ordinary writing instrument applied to a paper receipt over the digitizer;

means affixed to the digitizer of frictionally holding the receipt in place, including a layer of urethane rubber;

a guide for aligning an edge of the paper receipt;

means coupled to the digitizer and mounted within the housing for processing signature information;

means located externally on the top surface for holding an externally provided receipt in place over the digitizer on the top surface and for guarding the digitizer from finger contact including a transparent frame member, a window within the frame member over the digitizer, and a rib member mounted across the frame member, said holding and guarding means being operative to hold the receipt in place on the top surface of the housing during transfer of the device between a point-of-service operator and a customer; and means coupled to the digitizer for sensing the presence of the receipt and for activating data capture by the digitizer when the receipt is positioned under the holding and guarding means.

23. A method for capturing handwriting without immediate feedback from an electronic display comprising the steps of:

providing retaining means for holding an externally provided record member in a predetermined position on a digitizer;

inserting the record member between the retaining means and the digitizer;

applying a writing to the digitizer through the record member; and processing a signal representing the writing from the digitizer.

24. The method as recited in claim 23, wherein the digitizer is a pressure-sensitive digitizer.

25. The method as recited in claim 24, wherein the digitizer is sensitive to a writing force greater than or equal to a predetermined minimum writing force.

26. The method as recited in claim 25, wherein the minimum writing force is no more than about 10 to 15 grams.

27. The method as recited in claim 24, wherein the digitizer has upper and lower sheets electrically coupled at a plurality of dots by pressure from handwriting and has a near separation distance between dots of about 0.16 to 0.2 inches.

28. The method as recited in claim 24, wherein the digitizer has a sensitivity sufficient to capture handwriting that produces a legible ink impression on the record member.

29. The method as recited in claim 23, wherein the step of applying a writing comprises the substep of producing a legible ink impression on the record member using a pen.

30. The method as recited in claim 23, wherein the step of inserting the record member comprises a substep of aligning one edge of the record member along a guide mounted on the digitizer.

31. The method as recited in clam 23, further comprising the step of:
   guarding the digitizer from finger contact.

32. The method as recited in claim 31, further comprising the steps of:
   sensing the presence of the record member on the digitizer; and
   activating data capture by the digitizer in response to the sensing of the record member.

33. The method as recited in claim 23, wherein the record member has a reference mark.

34. The method as recited in claim 33, wherein the reference mark is a signature line.

35. The method as recited in claim 33, wherein the reference mark is a signature box.

36. A handwriting capture device comprising:
   a housing having a top surface;
   a digitizer, mounted within the top surface;
   a clamp for holding a record member in a predetermined position on the top surface, including an inverted L-shaped member mounted on the top surface of the housing having an inner horizontal surface and an inner vertical surface, a protrusion extending downwardly from the inner horizontal surface, and a receptacle corresponding to the shape of the protrusion within the top surface of the housing; and
   means coupled to the digitizer for processing written information.

37. A handwriting capture device comprising:
   a housing having a top surface;
   a digitizer, mounted within the top surface;
   a clamp for holding a record member in a predetermined position on the top surface, including an inverted L-shaped member mounted on the top surface of the housing having an inner horizontal surface and an inner vertical surface, a hemispherical protrusion extending downwardly from the inner horizontal surface, and a hemispherical receptacle corresponding to the shape of the protrusion within the top surface of the housing; and
   means coupled to the digitizer for processing written information.

38. A handwriting capture device comprising:
   a housing having a top surface;
   a digitizer, mounted within the top surface;
   a clamp for holding a record member in a predetermined position on the top surface, including a frame member, a window within the frame member and over the digitizer, and an upwardly flared portion at one end of the clamp for facilitating insertion of the record member into the clamp; and
   means coupled to the digitizer for processing written information.

* * * * *

UNITED STATES PATENT AND TRADEMARK OFFICE
CERTIFICATE OF CORRECTION

PATENT NO. : 5,120,906

DATED : June 9, 1992

INVENTOR(S) : Robert Protheroe et al.

It is certified that error appears in the above-identified patent and that said Letters Patent is hereby corrected as shown below:

Column 6, line 33, delete "of" and substitute --for--.

Signed and Sealed this

Third Day of August, 1993

Attest:

MICHAEL K. KIRK

Attesting Officer

Acting Commissioner of Patents and Trademarks